US012217722B2

(12) United States Patent
Kim et al.

(10) Patent No.: US 12,217,722 B2
(45) Date of Patent: Feb. 4, 2025

(54) FREQUENCY COMPENSATION FOR A DISPLAY

(71) Applicant: Google LLC, Mountain View, CA (US)

(72) Inventors: Hyunchul Kim, San Jose, CA (US); Chien-Hui Wen, Cupertino, CA (US); Ken Kok Foo, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/435,708

(22) Filed: Feb. 7, 2024

(65) Prior Publication Data

US 2024/0177687 A1 May 30, 2024

Related U.S. Application Data

(60) Provisional application No. 63/549,830, filed on Feb. 5, 2024.

(51) Int. Cl.
*G09G 3/36* (2006.01)
*G09G 5/02* (2006.01)

(52) U.S. Cl.
CPC ....... *G09G 5/02* (2013.01); *G09G 2320/0233* (2013.01)

(58) Field of Classification Search
None
See application file for complete search history.

(56) References Cited

U.S. PATENT DOCUMENTS

| | | | |
|---|---|---|---|
| 10,997,914 | B1 | 5/2021 | Hwang et al. |
| 2013/0135272 | A1 | 5/2013 | Park |
| 2013/0265342 | A1 | 10/2013 | Fujimura et al. |
| 2014/0267370 | A1 | 9/2014 | Albrecht et al. |
| 2014/0267448 | A1 | 9/2014 | Albrecht et al. |
| 2018/0158173 | A1 | 6/2018 | Gao et al. |
| 2018/0350313 | A1 | 12/2018 | Nambi et al. |

(Continued)

FOREIGN PATENT DOCUMENTS

| | | | |
|---|---|---|---|
| CN | 110310596 | A | 10/2019 |
| CN | 112288661 | A | 1/2021 |

(Continued)

OTHER PUBLICATIONS

Kim, et al., "A Novel LTPO AMOLED Pixel Circuit and Driving Scheme for Variable Refresh Rate", May 20, 2023, 16 pages.

(Continued)

*Primary Examiner* — Carl Adams
(74) *Attorney, Agent, or Firm* — Colby Nipper PLLC

(57) ABSTRACT

Techniques and apparatuses are described that perform frequency compensation for a display. In aspects, a first uniformity of multiple regions of the display can be measured at a reference frequency. The display can then be driven at a second frequency and a second uniformity of the multiple regions of the display can be measured. The differences between the first and second uniformity can then be used to generate a compensation mask. XYZ domain data from the first and second uniformity measurements can be used to generate a color model characterization. The color model characterization can be used to convert the XYZ domain data into RGB data when the display is driven at the second frequency to compensate for the differences in uniformity across the multiple regions of the display.

8 Claims, 6 Drawing Sheets

(56) References Cited

U.S. PATENT DOCUMENTS

| | | | | |
|---|---|---|---|---|
| 2019/0057661 | A1* | 2/2019 | Choi | G09G 3/2092 |
| 2021/0005158 | A1 | 1/2021 | Huang et al. | |
| 2022/0301469 | A1 | 9/2022 | Staten et al. | |
| 2023/0222950 | A1 | 7/2023 | Zhang | |
| 2023/0274678 | A1 | 8/2023 | Wen et al. | |

FOREIGN PATENT DOCUMENTS

| | | | |
|---|---|---|---|
| CN | 115035851 | A | 9/2022 |
| TW | 202404343 | A | 1/2024 |
| WO | 2023121684 | | 6/2023 |

OTHER PUBLICATIONS

Lee, et al., "Illumination-Level Adaptive Color Reproduction Method with Lightness Adaptation and Flare Compensation for Mobile Display", Jan. 2007, 9 pages.

Li, et al., "Advanced Metrology for Display Uniformity Performance Judgement", Technical Disclosure Commons, https://www.tdcommons.org/dpubs_series/7119, Jun. 21, 2024, 10 pages.

Li, et al., "Advanced Prediction Model for Variable Refresh Rate Compensation Compensation", May 29, 2024, 9 pages.

Li, et al., "Smart Mathematical Model for Variable Refresh Rate Prediction Algorithm", Technical Disclosure Commons, https://www.tdcommons.org/dpubs_series/7047, May 29, 2024, 10 pages.

* cited by examiner

FREQUENCY COMPENSATION FOR A DISPLAY

CROSS-REFERENCE TO RELATED APPLICATION(S)

This application claims the benefit of U.S. Provisional Patent Application Ser. No. 63/549,830 filed on Feb. 5, 2024, the disclosure of which is incorporated by reference herein in its entirety.

SUMMARY

Techniques and apparatuses are described that implement frequency compensation for a display. The present technology may employ processes to compensate for differences in uniformity in different regions of a display when driven at different frequencies. A first uniformity of the multiple regions of the display can be measured at a reference frequency. The reference frequency can be the frequency guaranteed by the manufacturer of the display to provide uniformity. The display can then be driven at a second frequency and a second uniformity of the multiple regions of the display can be measured. The measurements can be made in an XYZ domain as opposed to a Red Green Blue (RGB) domain. The differences between the first and second uniformity can then be used to generate a compensation mask. XYZ domain data from the first and second uniformity measurements can be used to generate a color model characterization. The color model characterization can be used to convert the XYZ domain data into RGB data when the display is driven at the second frequency to compensate for the differences in uniformity across the multiple regions of the display. Thus the display can provide uniformity when driven at different frequencies for variable refresh rate (VRR).

In aspects, a method is disclosed that includes: driving a display at a first frequency with a control signal via a device controller, the first frequency being a reference frequency; measuring a first uniformity, at the first frequency, of multiple regions of the display in an XYZ domain at the reference frequency; driving the display at a second frequency with the control signal via the device controller; measuring a second uniformity, at the second frequency, of the multiple regions of the display in the XYZ domain; generating a compensation mask to compensate for a difference between the second uniformity and the first uniformity; generating a color model characterization based on the difference between the second uniformity and the first uniformity to generate a conversion formula; converting data associated with the XYZ domain to RGB data using the conversion formula; and applying the RGB data and the compensation mask to the display with the display being driven at the second frequency to compensate for the difference between the first uniformity and the second uniformity.

This Summary is provided to introduce simplified concepts systems and is directed at frequency compensation for a display, the concepts of which are further described below in the Detailed Description and Drawings. This Summary is not intended to identify essential features of the claimed subject matter, nor is it intended for use in determining the scope of the claimed subject matter.

BRIEF DESCRIPTION OF DRAWINGS

Apparatuses for and techniques for frequency compensation for a display are described with reference to the following drawings. The same numbers are used throughout the drawings to reference like features and components.

DETAILED DESCRIPTION

Figure 1:
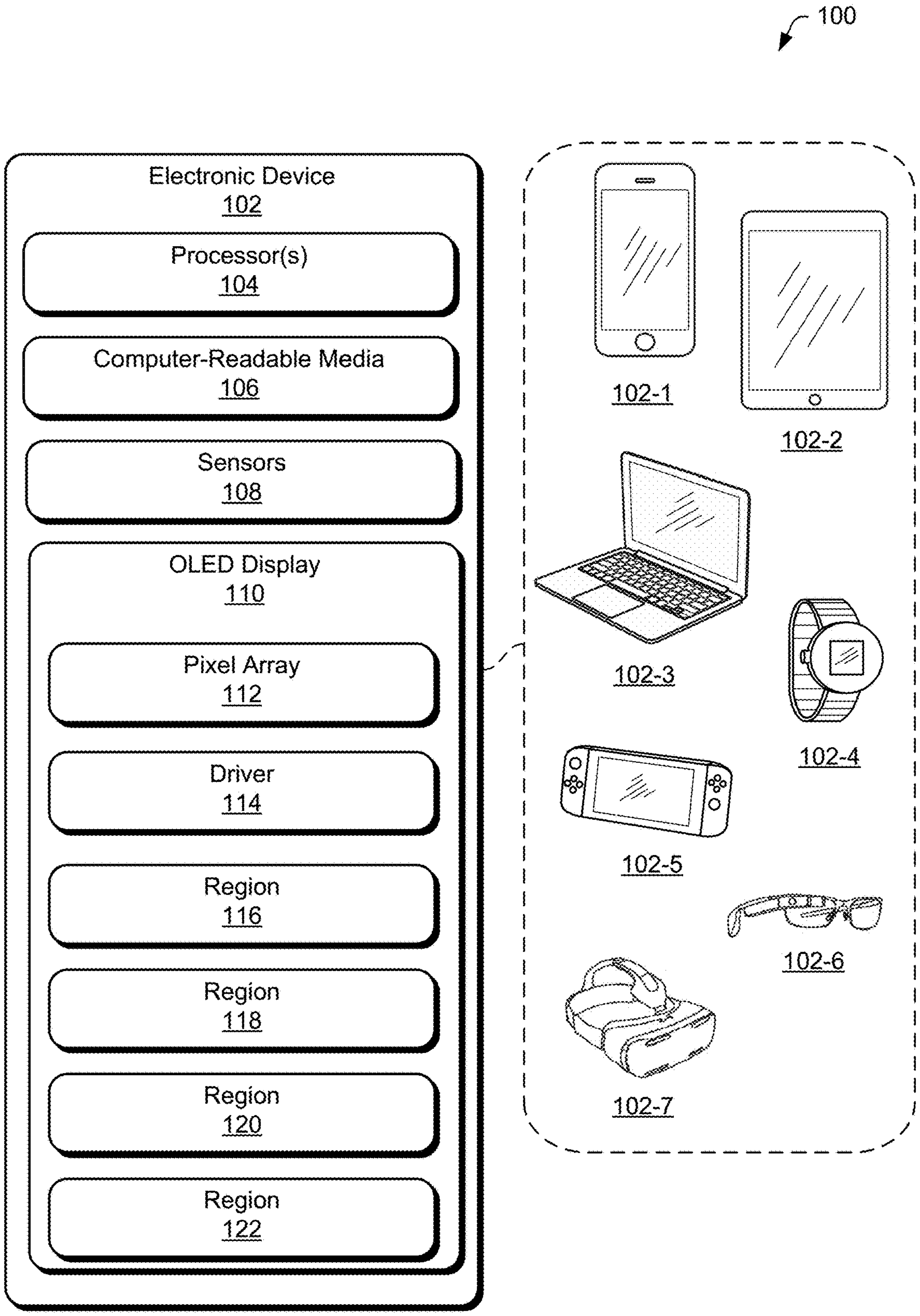
FIG. 1 illustrates an example device diagram of an electronic device in which frequency compensation for a display can be implemented.

Systems and techniques directed at frequency compensation for a display are disclosed. Many electronic devices (e.g., wireless-network devices, desktops, smartwatches) include an electronic visual display, often referred to as a display or screen, integrated as a portion of the electronic device's housing. Electronic device manufacturers fabricate these displays in a layered structure ("display panel stack"), containing a cover layer (e.g., cover glass) and a display module having a display panel.

These display panels include an array of pixel circuits, each having an organic light emitting diode ("pixel"). The pixels may be composed of any colored combination of one or more subpixels, including a red subpixel, a green subpixel, and/or a blue subpixel. Electronic devices can control any of the pixels within a display panel to illuminate at various intensities and wavelengths (e.g., combined wavelengths of the sub-pixels), effective to produce on-screen content (e.g., images). By exploiting a feature of the human eye and brain referred to as persistence of vision (e.g., retinal persistence), a display panel can redraw on-screen content at predetermined frequencies ("refresh rate") to save power, change on-screen content (e.g., scrolling) seamlessly, and give an illusion of on-screen content as images in motion (e.g., video). For example, a display panel configured to operate at a 120 hertz (Hz) refresh rate can redraw on-screen content 120 times per second. The benefits of displays such as organic light-emitting diode (OLED) displays include high refresh rates, small display response times, and low power consumption. These benefits make OLED displays well-suited for electronic devices, and are further appreciated by users, in large part, because of their display image-quality.

In example aspects, display technology, including low temperature polysilicon liquid crystal displays (LTPSs), can be driven at different refresh rates meaning different frequencies. It should be appreciated the LTPS displays are one type of OLED displays. For example, at different times during use of a device such as a smartphone, an LTPS display may be driven at 60, 90, or 120 Hz for different purposes. Lower frequencies may be employed for battery saving techniques while higher frequencies may be employed for applications such as displaying video. Changing the frequency or refresh rate during use of the display can be referred to as a VRR. A manufacturer of the display may manufacture the display such that multiple regions of the display are uniform relative to one another while driven at a first frequency but the multiple regions of the display are not uniform relative to one another when the display is driven at frequencies other than the first frequency. The difference in uniformity between regions of the same display when driven at different refresh rates can be referred to as transition flicker. The present technology generates compensations masks and RGB data such that the multiple regions of the display will be uniform when driven at frequencies different from the first frequency.

The following discussion describes operating environments, techniques that may be employed in the operating environments, and example methods. Although techniques using and apparatuses for frequency compensation for a display are described, it is to be understood that the subject of the appended claims is not necessarily limited to the specific features or methods described. Rather, the specific features and methods are disclosed as example implementations and reference is made to the operating environment by way of example only.

Example Environment

FIG. 1 illustrates an example device diagram 100 of an electronic device 102 in which frequency compensation for a display can be implemented. The electronic device 102 may include additional components and interfaces omitted from FIG. 1 for the sake of clarity. The electronic device 102 can be a variety of consumer electronic devices. As non-limiting examples, the electronic device 102 can be a smartphone 102-1, a tablet device 102-2, a laptop computer 102-3, a computerized watch 102-4, a portable video game console 102-5, smart glasses 102-6, virtual-reality (VR) goggles 102-7, and the like.

The electronic device 102 includes one or more processors 104. The processor(s) 104 can include, as non-limiting examples, a system-on-a-chip (SoC), an application processor (AP), a central processing unit (CPU), or a graphics processing unit (GPU). The processor(s) 104 generally execute commands and processes utilized by the electronic device 102 and an operating system installed thereon. For example, the processor(s) 104 can perform operations to display graphics of the electronic device 102 on a display and can perform other specific computational tasks, such as controlling the creation and display of an image on the display.

The electronic device 102 also includes computer-readable media (CRM) 106. The CRM 106 is a suitable storage device (e.g., random-access memory (RAM), static RAM (SRAM), dynamic RAM (DRAM), non-volatile RAM (NVRAM), read-only memory (ROM), flash memory) configured to store device data of the electronic device 102, user data, and multimedia data. The CRM 106 may store an operating system that generally manages hardware and software resources (e.g., the applications) of the electronic device 102 and provides common services for applications stored on the CRM 106. The operating system and the applications are generally executable by the processor(s) 104 to enable communications and user interaction with the electronic device 102.

The electronic device 102 further includes one or more sensors 108. In some examples, the sensors 108 may be disposed on or in a peripheral input device connected (e.g., wired, wirelessly) to the electronic device 102. In implementations, the sensors 108 include display sensors including a touch-input sensor (e.g., a touchscreen), an image-capture device (e.g., a camera, video-camera), proximity sensors (e.g., capacitive sensors), an ambient light sensor (e.g., photodetector), and/or an under-display fingerprint sensor (UDFPS).

The electronic device 102 further includes an OLED display 110 having a pixel array 112 and a driver 114 that can be described as a display driver integrated circuit. Although an OLED display 110 is described herein, it is provided as an example only. In additional or alternative implementations, the electronic device 102 may include any of a variety of displays, including an active-matrix OLED (AMOLED) display, an electroluminescent display (ELD), a microLED display, a liquid crystal display (LCD), a thin film transistor (TFT) LCD, an in-place switching (IPS) LCD, a plasma monitor panel (PDP), and so forth.

Further, the driver 114 may control the pixel circuits of a pixel array 112 for the OLED display 110. The pixel array 112 may include multiple regions including region 116, region 118, region 120, region 122. The OLED display 110 may be driven by the driver 114 at different frequencies. Driving the OLED display 110 at a given frequency can result in differences in uniformity between the regions 116, 118, 120, and 122. A compensation mask and RGB data may be applied to the OLED display 110 by the driver 114 when driven at the given frequency to compensate for the differences between the regions 116, 118, 120, and 122 such that the regions 116, 118, 120, and 122 appear uniform when driven at the given frequency. Together, under the direction of the processor(s) 104, the driver 114 controls the pixel array 112 to generate light to create an image on the OLED display 110.

In one aspect, a first uniformity of the multiple regions of the OLED display 110 can be measured at a reference frequency, such as 120 Hz. The reference frequency can be the frequency guaranteed by the manufacturer of the display to provide uniformity. The OLED display 110 can then be driven at a second frequency, such as 90 Hz or 60 Hz, and a second uniformity of the multiple regions of the display can be measured. The measurements can be made in an XYZ domain as opposed to a RGB domain. The differences between the first and second uniformity can then be used to generate a compensation mask. XYZ domain data from the first and second uniformity measurements can be used to generate a color model characterization. The color model characterization can be used to convert the XYZ domain data into RGB data when the OLED display 110 is driven at the second frequency to compensate for the differences in uniformity across the multiple regions of the OLED display 110.

Figure 2A:
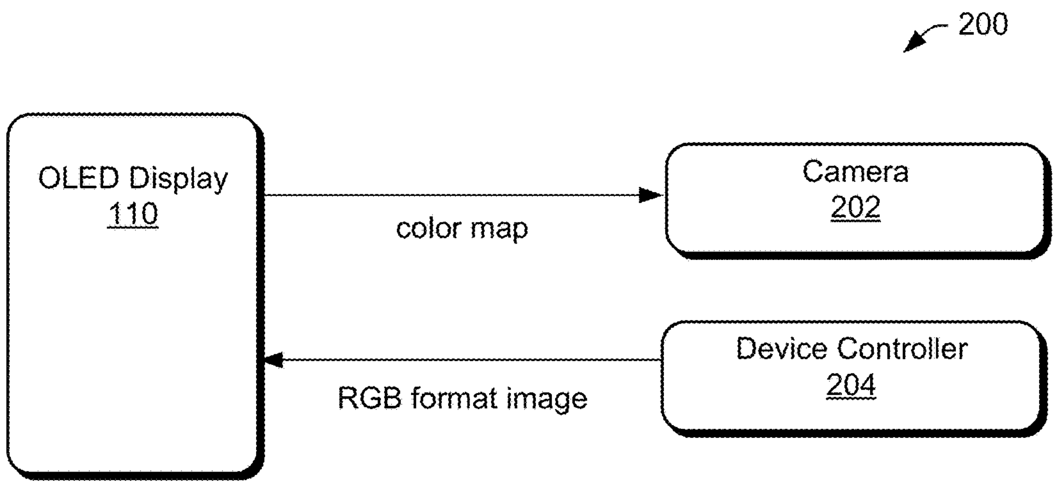
FIGS. 2A and 2B illustrate example systems of diagrams in which frequency compensation for a display can be implemented.
Figure 2B:
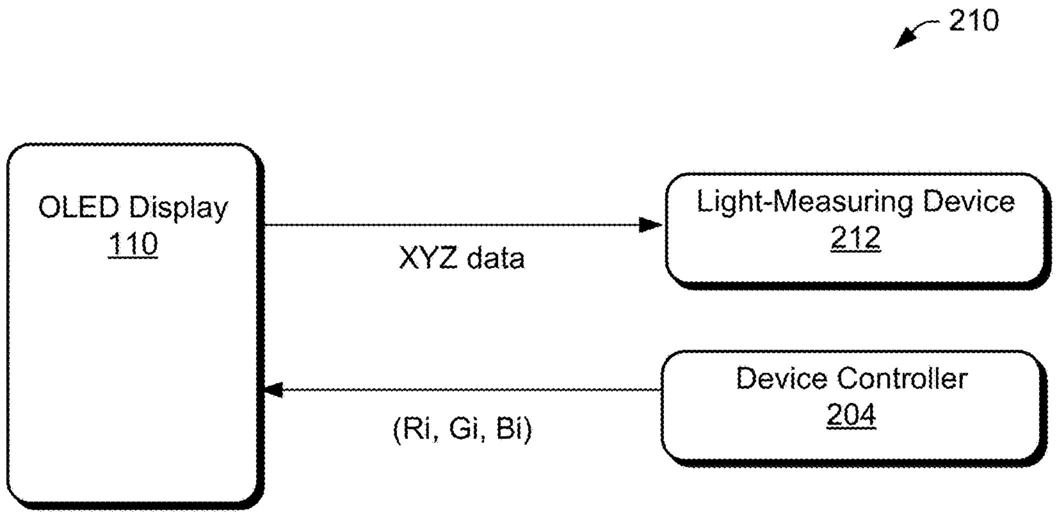

FIGS. 2A and 2B illustrate example systems of diagrams 200 and 210, respectively, in which frequency compensation for a display can be implemented. Diagram 200 depicts the OLED display 110 with a camera 202 and a device controller 204. The device controller 204 can drive the OLED display 110 at different frequencies and the camera 202 can measure the light output by the OLED display 110. The camera 202 can be a two-dimensional (2D) camera that is capable of measuring a color map of different regions of the OLED display 110 when driven at different frequencies.

In one aspect, the OLED display 110 can be manufactured or tuned such that multiple regions of the OLED display 110 are uniform when driven at a certain frequency. For example, the OLED display 110 can be designed or manufactured with 120 Hz as a frequency that provides uniformity across all regions of the display. This frequency may be described as the reference frequency. The reference frequency may be guaranteed to provide uniformity by the manufacturer of the OLED display 110. The OLED display 110 may not be manufactured with a guarantee of uniformity across multiple regions for different frequencies, the OLED display 110 may not be manufactured with such guarantees for different frequencies to reduce cost in manufacturing the OLED display 110. However, in use the OLED display 110 may be driven at different frequencies for purposes such as reducing power consumption to increase battery life.

In one aspect, diagram 200 depicts a system for generating a uniformity-gain estimation that can be performed before the OLED display 110 is shipped to a consumer. The OLED display 110 can be driven at the reference frequency by the device controller 204. In one example, the reference frequency is 120 Hz. The device controller 204 can drive the OLED display 110 using an RGB format image that causes the OLED display 110 to display an image or video and can be referred to as a control signal. The camera 202 is used to capture light from the OLED display 110. The light captured by the camera 202 can be a color map that provides information or data about the uniformity of different regions of the OLED display 110 as compared to one another. In one example, the camera 202 can be a 2D camera or other image capturing device. The device controller 204 can vary the control signal while driving the OLED display 110 at the reference frequency. For example, the control signal can provide low, mid and high decibel Volt (dBv) settings as well as low, mid and high gray levels.

After data has been captured by the camera 202 while the OLED display 110 is driven at the reference frequency, the OLED display 110 can be driven at a second frequency by the device controller 204 and data can be captured by the camera 202. This process can be repeated for any number of frequencies that are different from the reference frequency. For example, a second frequency can be 90 Hz and a third frequency can be 60 Hz.

In one aspect, the color map captured by the camera 202 can have XYZ data in two dimensions. The XYZ data can include RGB data as well as other data. In one example, the X measures red color, the Y measures green color, and the Z measures blue color. The XYZ can also include data such as gain, luminosity, brightness, sharpness, etc. The XYZ data in the XYZ domain or CIE color space for RGB control signal input can be represented by $X_{i,j,k(U,V)}$ where (U,V) represents a pixel in the pixel resolution of the OLED display 110. Example data for pixel (U,V) can be i∈{60 Hz, 90 Hz, 120 Hx}; j∈{0×100, 0×200, . . . 0×FFF}; k∈{G32, G64, G128, . . . G255}; U∈{0, 1, 2, U−1}; and V∈{0, 1, 2, V−1}. The XYZ color map can be used to generate the uniformity gain estimation for each frequency that the OLED display 110 is driven at by the device controller 204.

FIG. 2B and diagram 210 depict a system for generating a color model characterization. The diagram 210 includes the OLED display 110, the device controller 204, and a light-measuring device 212. The light-measuring device 212 can be a colorimeter or a spectroradiometer that is used for capturing data from the OLED display 110 when the OLED display 110 is driven at a frequency by the device controller 204. In one aspect of diagram 210, the control signal from the device controller 204 can include RGB data (Ri, Gi, Bi) as well as gray colors used to characterize a color model of the OLED display 110.

The color model characterization can be generated by equation 1:

$$C+H*D \rightarrow H=C*inv(D) \qquad \text{Equation 1}$$

In Equation 1, C represents CIE X,Y,Z value for corresponding RGB patterns, in other words, C represents the color transfer function RGB to XYZ transfer function, D represents RGB digital values, and H represents a color transform function. Example values for D and C are shown below:

$$D=\begin{pmatrix} R0G0B0 & R1G1B1 & R2G2B2 & R3G3B3 & --- & RiGiBi \\ R0G0B0 & R1G1B1 & R2G2B2 & R3G3B3 & & RiGiBi \\ R0G0B0 & R1G1B1 & R2G2B2 & R3G3B3 & & RiGiBi \end{pmatrix}$$

$$C=\begin{pmatrix} X_{R0G0B0} & X_{R1G1B1} & X_{R2G2B2} & X_{R3G3B3} & --- & X_{RiGiBi} \\ Y_{R0G0B0} & Y_{R1G1B1} & Y_{R2G2B2} & Y_{R3G3B3} & & Y_{RiGiBi} \\ Z_{R0G0B0} & Z_{R1G1B1} & Z_{R2G2B2} & Z_{R3G3B3} & & Z_{RiGiBi} \end{pmatrix}$$

To convert the XYZ data to RGB data and generate the compensation mask, the matrix of data $X_{i,j,k}$ can be processed using equation 2:

$$G_{i,j,k}=X_{i,j,k}/X_{i,j,k\_ref} \qquad \text{Equation 2}$$

In Equation 2, $X_{i,j,k\_ref}$ is a 2D image map with constant luminance value. For example, the reference frequency can be used to generate $X_{i,j,k\_ref}$ and $X_{i,j,k}$ is generated using a second frequency different from the reference frequency. $G_{i,j,k}$ is a gap between the measured luminance of $X_{i,j,k\_ref}$ and a desired luminance response for $X_{i,j,k}$.

Equation 3 can be used to generate the color transform function H:

$$X_{i,j,k_{ref}}=\frac{X_{i,j,k}}{G_{i,j,k}}=C*\frac{D_{i,j,k}}{G_{i,j,k}}=\left(\frac{C}{G_{i,j,k}}\right)*D_{i,j,k} \qquad \text{Equation 3}$$

Equation 4 can be generated using $G_{i,j,k}$ and the systems of diagrams 200 and 210:

$$\left(\frac{1}{G_{i,j,k}}\right) \qquad \text{Equation 4}$$

Equation 4 can then be sent to a device that incorporates the OLED display 110. The results of equation 4 can be stored and used by a uniformity-gain look-up-table memory component of the device that incorporates the OLED display 110. Equation 5 can be described as frequency adaptive uniformity compensation logic:

$$\left(\frac{1}{G_{i,j,k}}\right)*D_{i,j,k} \qquad \text{Equation 5}$$

The results of equations 4 and 5 can be used by the device that incorporates the OLED display 110 to compensate for differences in uniformity between different regions of the OLED display 110 when driven at a certain frequency. It should be appreciated that the results of equations 4 and 5 may be associated with a particular frequency, such as 90 Hz, and different results from equations 4 and 5 may be associated with a different frequency, such as 60 Hz. The different results can be used by the device that incorporates the OLED display 110 when driving the OLED display 110 at the associated frequencies.

Applying equations 4 and 5 can cause gamma and 3D color correction for the OLED display 110 when driven at an associated frequency. In one aspect, the equations 3, 4, and 5 can be generated for each unique display that is manufactured. Alternatively, the equations 3, 4, and 5 can be generated for a representative display that is similar to and representative of multiple displays (e.g., a group of displays)

and the results of the equations 3, 4, and 5 can be applied to each of the displays. Thus, the RGB data and the compensation mask are applied to multiple displays being driven at the second frequency. The equations 3, 4, and 5 can be generated for a OLED display 110 before the OLED display 110 is incorporated into a device.

Figure 3A:
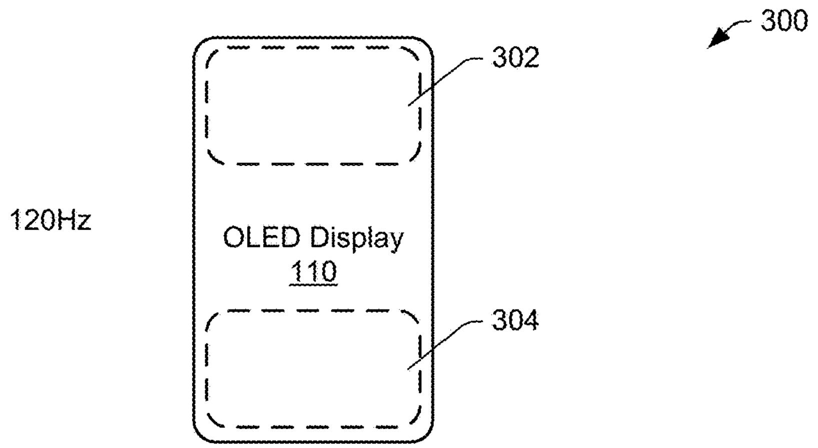
FIGS. 3A, 3B, and 3C illustrate example diagrams in which frequency compensation for a display can be implemented.
Figure 3B:
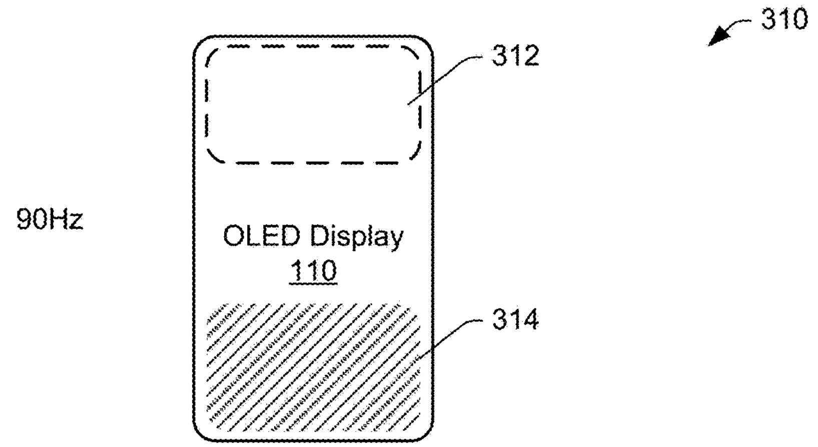
Figure 3C:
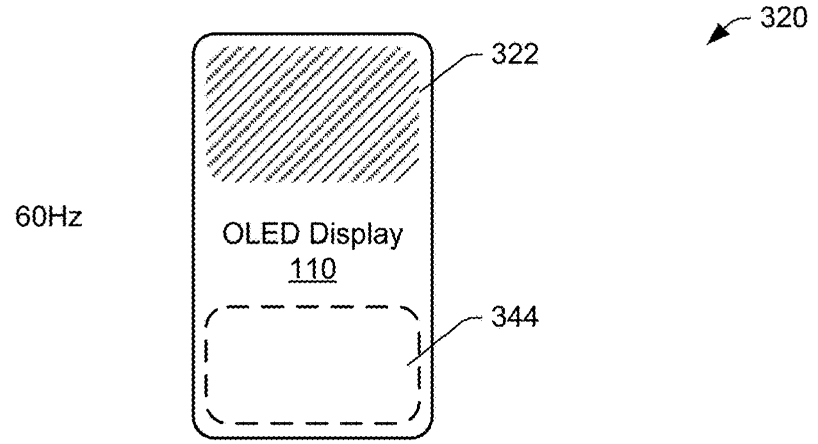

FIGS. 3A, 3B and 3C illustrate example diagrams 300, 310, and 320, respectively, in which frequency compensation for a display can be implemented. Diagram 300 depicts the OLED display 110 with region 302 and region 304. The OLED display 110 is driven at the reference frequency of 120 Hz. The regions 302 and 304 show no differences in uniformity.

Diagram 310 depicts the OLED display 110 with region 312 and region 314. The OLED display 110 is driven at the second frequency of 90 Hz before any compensation has been applied. The regions 312 and 314 show differences in uniformity. For example, region 314 depicts cross hatching representing that region 314 is darker than region 312.

Diagram 320 depicts the OLED display 110 with region 322 and region 324. The OLED display 110 is driven at the third frequency of 60 Hz before any compensation has been applied. The regions 322 and 324 show differences in uniformity. For example, region 322 depicts cross hatching representing that region 344 is darker than region 312.

Comparing diagrams 300, 310, and 320 demonstrates that different regions of the OLED display 110 react differently when the OLED display 110 is driven at different frequencies. After applying the techniques disclosed herein, the differences in uniformity of the regions in diagrams 310 and 320 may no longer be apparent and the regions may appear uniform.

Figure 4:
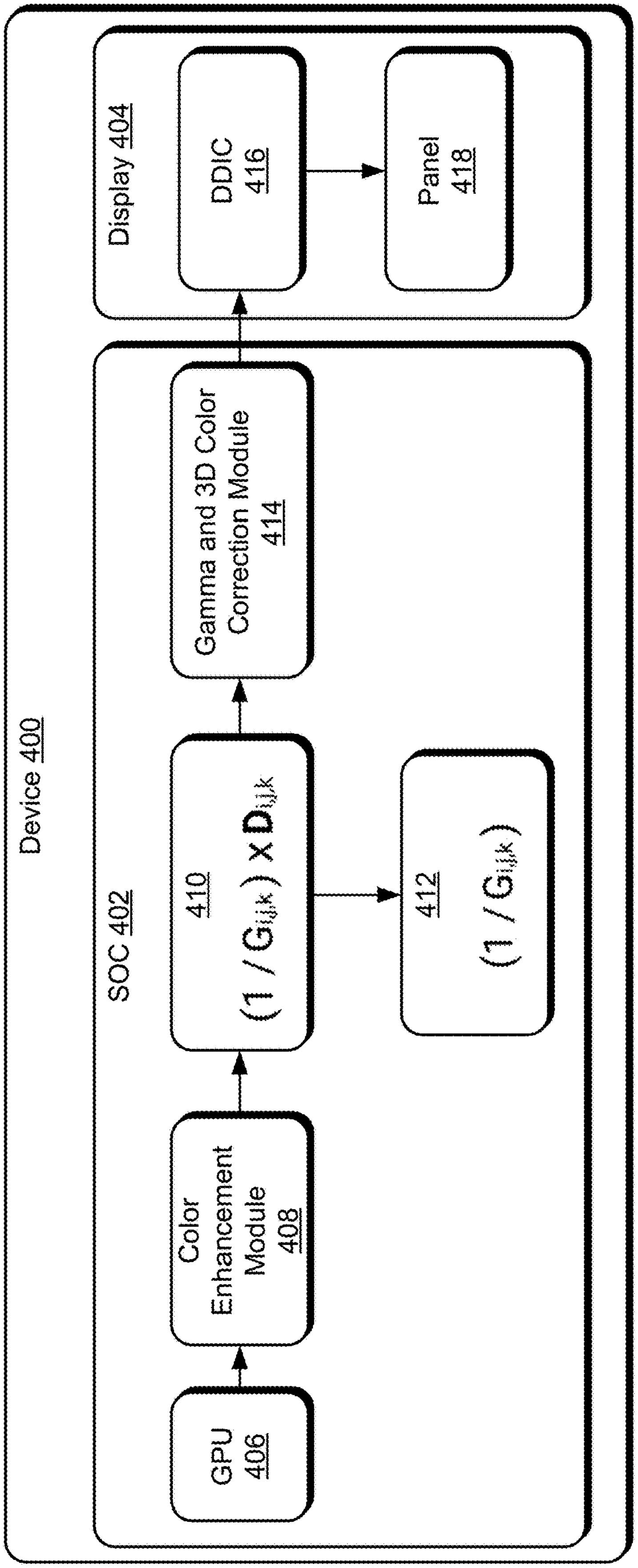
FIG. 4 illustrates an example diagram of a device in which frequency compensation for a display can be implemented.

FIG. 4 illustrates an example diagram of a device 400 in which frequency compensation for a display can be implemented. The device 400 may have the same features and capabilities as the electronic device 102 of FIG. 1. The SOC 402 is a system on a chip associated with the device 400. The OLED display 110 of FIG. 1 may be incorporated in the device 400 and can be represented by the display 404. FIG. 4 illustrates a flow in which the techniques described herein may be implemented in the device 400 including the SOC 402 and the display 404. The SOC 402 may include GPU 406, which is a graphics processing unit configured to process display data for a display. Data from the GPU 406 can be sent to a color enhancement module 408. Data from the color enhancement module 408 can be $D_{i,j,k}$, as described above, and be sent to a first compensation module 410. The first compensation module 410 can receive input from a second compensation module 412, which includes applying equation 4 to the data generated in the first compensation module 410. The equation 4 can be applied depending on the driving frequency (i) and the dBv values (j), different gain can be multiplied to input RGB data $D_{i,j,k}$. The first compensation module 410 can apply equation 5. The first compensation module 410 can be described as frequency adaptive uniformity compensation logic.

Data from the first compensation module 410 can be sent to a gamma and 3D color correction module 414. Data from the gamma and 3D color correction module 414 can be sent out of the SOC 402 to a data dictionary (DDIC) 416 associated with the display 404. The DDIC 416 can be a display driver integrated circuit which uses the data from the gamma and 3D color correction module 414 to drive a panel 418 of the display 404.

Figure 5B:
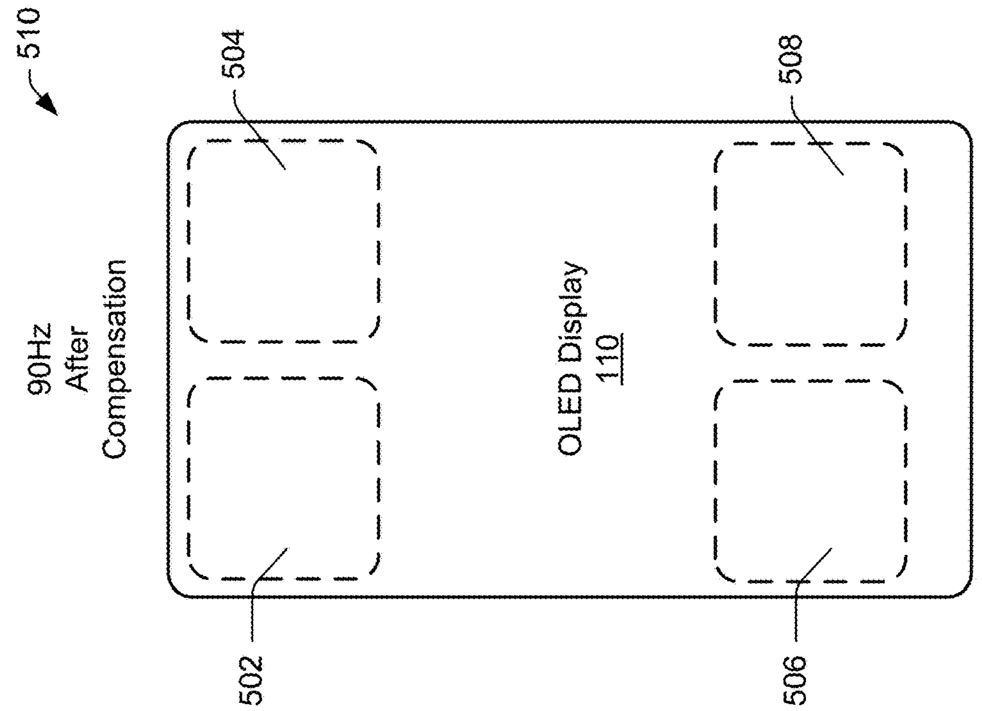
FIGS. 5A and 5B illustrate example diagrams in which frequency compensation for a display can be implemented.
Figure 5A:
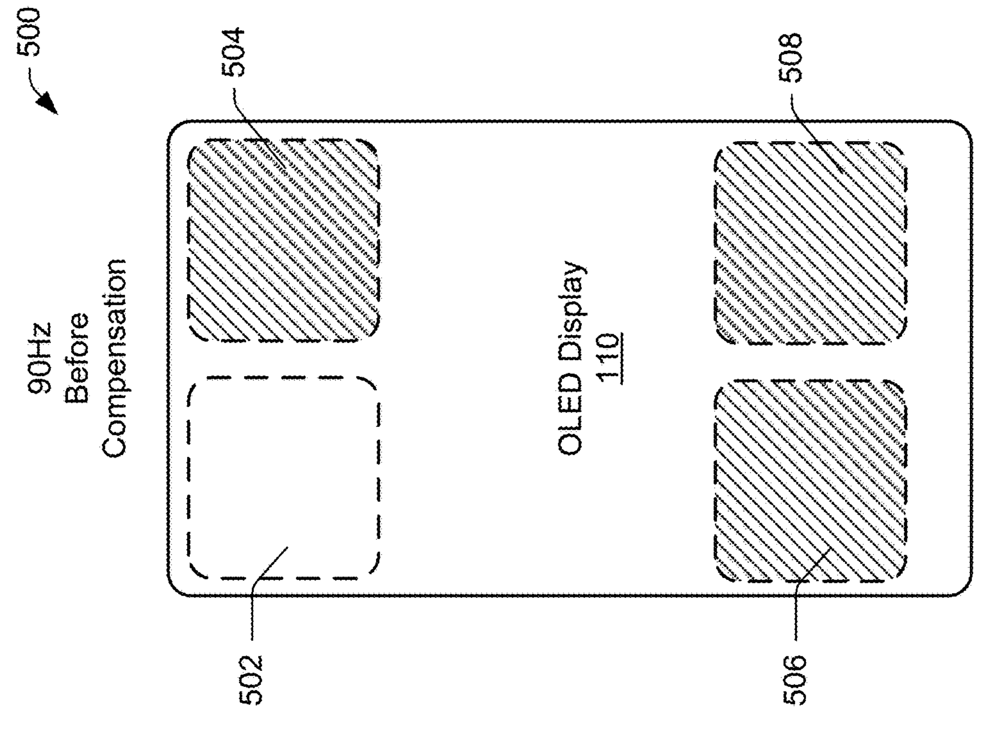

FIGS. 5A and 5B illustrate example diagrams 500 and 510, respectively, in which frequency compensation for a display can be implemented. Diagram 500 depicts the OLED display 110 with regions 502, 504, 506, and 508 while being driven at 90 Hz before frequency compensation is applied. The regions 504, 506, and 508 are depicted with cross hatching representing a difference in uniformity as compared to the region 502. Diagram 510 depicts the OLED display 110 with regions 502, 504, 506, and 508 while being driven at 90 Hz after frequency compensation is applied. The regions 502, 504, 506, and 508 in the diagram 510 are depicted with no cross hatching representing that the regions 502, 504, 506, and 508 are uniform compared to one another. The uniformity being due to frequency compensation being applied to the OLED display 110. While diagrams 500 and 510 depict four distinct regions of the OLED display 110, it should be appreciated that in various aspects, any number of regions for the OLED display 110 can be measured and frequency compensation can be applied. In one aspect, each portion of the OLED display 110 can be represented by a region such that the whole of the OLED display 110 has the potential for frequency compensation to be applied in accordance with the techniques described herein.

In one aspect, the described techniques can measure for uniformity and apply frequency compensation at portions of the OLED display 110 and not across the whole of the OLED display 110. For example, the regions 502, 504, 506, and 508 are depicted as being located at the four corners of the OLED display 110. An example embodiment may measure for uniformity at the four corners such as the regions 502, 504, 506, and 508 and apply frequency compensation as needed at the four corners. In such an example, sections of the OLED display 110 outside of the regions 502, 504, 506, and 508 are not measured for uniformity and frequency compensation is not applied. Thus the compensation mask may only be applied at the regions 502, 504, 506, and 508. By measuring and applying frequency compensation to some portions of the OLED display 110 and not others can increase manufacturing time and efficiency. Selection of which portions of the OLED display 110 to apply the frequency compensation can be based on portions of displays that typically suffer from differences in uniformity, such as the four corners of the display or the bottom and top portions of the display.

Example Methods

Figure 6:
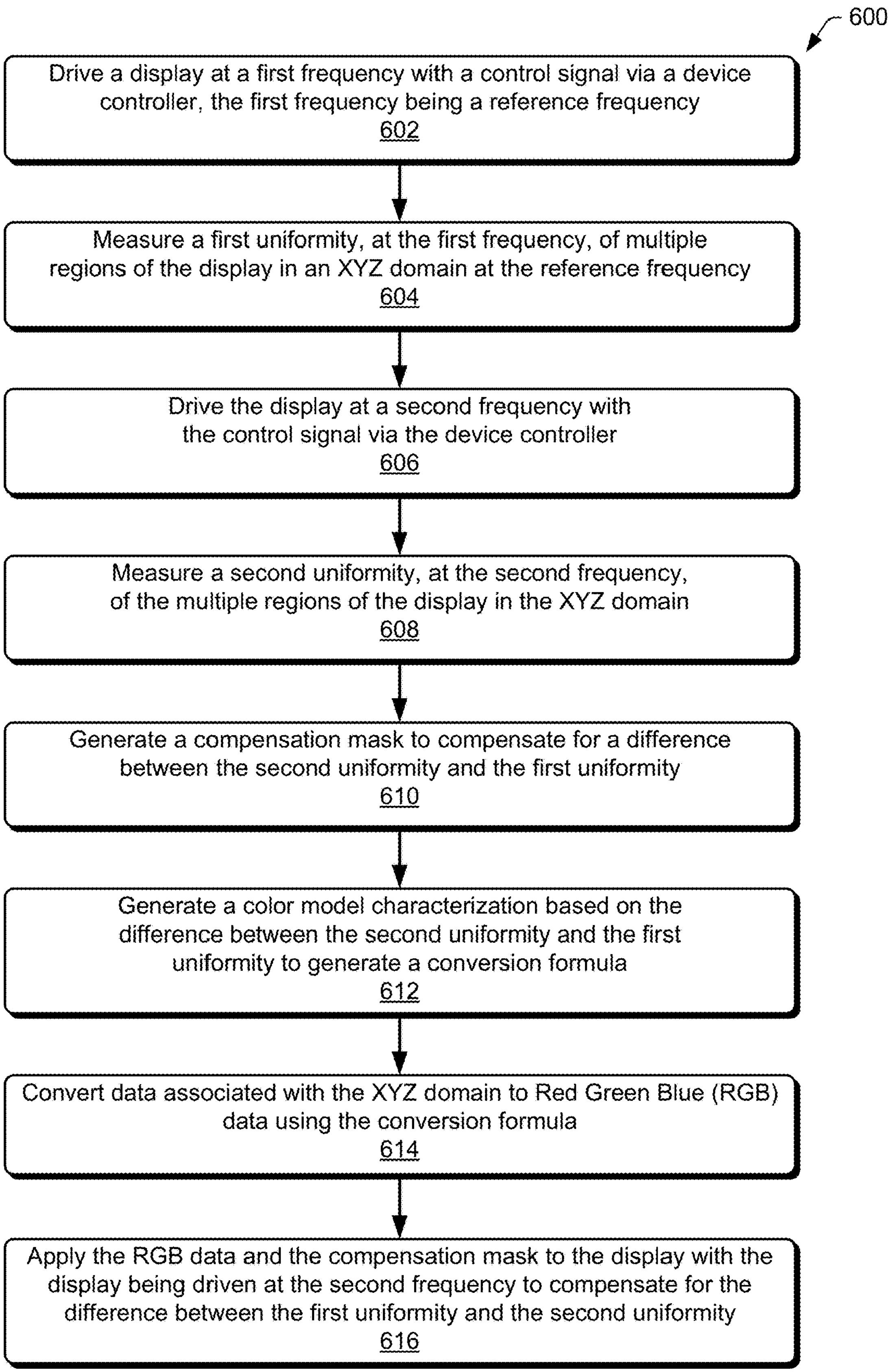
FIG. 6 depicts a method for implemented aspects of frequency compensation for a display.

FIG. 6 depicts example method 600 for implementing aspects of frequency compensation for a display (e.g. OLED display 110). Method 600 is shown as a set of operations (or acts) performed but not necessarily limited to the order or combinations in which the operations are shown herein. Further, any of one or more of the operations may be repeated, combined, reorganized, or linked to provide a wide array of additional and/or alternate methods. In portions of the following discussion, reference may be made to the example device diagram 100 of FIG. 1, and entities detailed in FIGS. 2A, 2B, 3A, 3B, 3C, 4, 5A, and 5B, reference to which is made for example only. The techniques are not limited to performance by one entity or multiple entities operating on one device.

At step 602, a display is driven at a first frequency with a control signal via a device controller, the first frequency being a reference frequency. The display can be driven at the first frequency for a first period of time. In an example, the reference frequency can be a frequency at which the manufacturer of the display guarantees uniformity between regions of the display. In one aspect, the reference frequency is 120 Hz but could be any other frequency. In one aspect, no differences of uniformity are measured between the difference regions at the reference frequency. In one aspect, the first frequency is considered a high speed frequency as compared to a second frequency, which is considered a normal or low speed frequency. For example, 120 Hz may be considered a high speed frequency, 90 Hz a normal frequency, and 60 Hz a low speed frequency.

At step 604, a first uniformity is measured, at the first frequency, of multiple regions of the display in an XYZ domain at the reference frequency. The multiple regions of the display may combine to cover the whole of the display or may cover different portions of the display.

At step 606, the display is driven at a second frequency with the control signal via the device controller. The display can be driven at the second frequency for a second period of time. The second period of time is different from the first period of time. The second frequency may be different from the first frequency, such as 60 Hz or 90 Hz.

At step 608, a second uniformity is measured, at the second frequency, of the multiple regions of the display in the XYZ domain. At the second frequency, differences in uniformity between the different regions of the display may be measured.

At step 610, a compensation mask is generated to compensate for a difference between the second uniformity and the first uniformity. The compensation mask may be calculated using the equations described above.

At step 612, a color model characterization is generated based on the difference between the second uniformity and the first uniformity to generate a conversion formula. The color model characterization may be calculated using the equations described above.

At step 614, data associated with the XYZ domain is converted to RGB data using the conversion formula. For example, a formula or a color conversion model can be employed to convert from XYZ data to RGB data.

At step 616, the RGB data and the compensation mask are applied to the display with the display being driven at the second frequency to compensate for the difference between the first uniformity and the second uniformity. In one example, the RGB data and the compensation mask are applied to the display after the display is incorporated into a device. In another example, the RGB data and the compensation mask are applied to multiple displays being driven at the second frequency.

In one aspect, the steps of method 600 can be repeated for a third frequency to generate a compensation mask and RGB data unique to the third frequency.

Conclusion

Although techniques using, and apparatuses including, frequency compensation for a display have been described in language specific to features and/or methods, it is to be understood that the subject of the appended claims is not necessarily limited to the specific features or methods described. Rather, the specific features and methods are disclosed as example implementations of frequency compensation for a display.

What is claimed is:

1. A method comprising:

driving a display at a first frequency with a control signal via a device controller, the first frequency being a reference frequency;

measuring a first uniformity, at the first frequency, of multiple regions of the display in an XYZ domain at the reference frequency;

driving the display at a second frequency with the control signal via the device controller;

measuring a second uniformity, at the second frequency, of the multiple regions of the display in the XYZ domain;

generating a compensation mask to compensate for a difference between the second uniformity and the first uniformity;

generating a color model characterization based on the difference between the second uniformity and the first uniformity to generate a conversion formula;

converting data associated with the XYZ domain to Red Green Blue (RGB) data using the conversion formula; and applying the RGB data and the compensation mask to the display with the display being driven at the second frequency to compensate for the difference between the first uniformity and the second uniformity.

2. The method of claim 1, wherein the multiple regions of the display do not have a difference in uniformity when driven at the first frequency, and wherein a first region of the multiple regions of the display has a 3-10% difference in uniformity compared to a second region of the multiple regions when the display is driven at the second frequency.

3. The method of claim 1, wherein the first frequency is a high speed frequency, the display is manufactured to provide uniformity across the multiple regions of the display, and the second frequency is a normal or low speed frequency.

4. The method of claim 1, wherein the first frequency is 120 hertz (Hz) and the second frequency is 60 Hz or 90 Hz.

5. The method of claim 1, further comprising:

driving the display at a third frequency; and measuring a third uniformity, at the third frequency, of the multiple regions of the display in the XYZ domain, wherein the compensation mask compensates for differences between the third uniformity and the first uniformity.

6. The method of claim 1, wherein the measuring of the first uniformity and the second uniformity is accomplished via a two dimensional camera associated with the device controller.

7. The method of claim 1, wherein the display is employed as a part of a smartphone and is driven at the first frequency for a period of time and at the second frequency for a different period of time.

8. The method of claim 1, wherein the RGB data and the compensation mask are applied to multiple displays being driven at the second frequency.

* * * * *